US008335793B2

(12) United States Patent
Young, Jr. et al.

(10) Patent No.: US 8,335,793 B2
(45) Date of Patent: Dec. 18, 2012

(54) SYSTEM AND METHOD FOR OPTIMIZED FILTERED DATA FEEDS TO CAPTURE DATA AND SEND TO MULTIPLE DESTINATIONS

(75) Inventors: James R. Young, Jr., Marysville, WA (US); Nathan Fong, Seattle, WA (US); Henrik Steen, Kirkland, WA (US); Srinivasan Sudanagunta, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 342 days.

(21) Appl. No.: 12/229,482

(22) Filed: Aug. 22, 2008

(65) Prior Publication Data

US 2010/0049710 A1 Feb. 25, 2010

(51) Int. Cl.
G06F 17/00 (2006.01)
G06F 17/30 (2006.01)
(52) U.S. Cl. .................. 707/758; 707/782; 709/238
(58) Field of Classification Search .................. 707/758, 707/780, 782; 709/238
See application file for complete search history.

(56) References Cited

U.S. PATENT DOCUMENTS

| 6,816,490 | B1 * | 11/2004 | Chung | 370/392 |
|---|---|---|---|---|
| 7,187,941 | B2 * | 3/2007 | Siegel | 455/519 |
| 7,299,296 | B1 * | 11/2007 | Lo et al. | 709/238 |
| 7,343,364 | B2 * | 3/2008 | Bram et al. | 706/47 |
| 2002/0085567 | A1 * | 7/2002 | Ku et al. | 370/396 |
| 2004/0002350 | A1 * | 1/2004 | Gopinath et al. | 455/466 |
| 2005/0204037 | A1 * | 9/2005 | Levy | 709/225 |
| 2005/0213572 | A1 * | 9/2005 | Huang et al. | 370/389 |
| 2005/0233759 | A1 * | 10/2005 | Anvekar et al. | 455/466 |
| 2006/0047960 | A1 * | 3/2006 | Ono et al. | 713/171 |
| 2006/0153187 | A1 * | 7/2006 | Agrawal et al. | 370/389 |
| 2006/0206504 | A1 * | 9/2006 | Cai et al. | 707/100 |
| 2007/0195777 | A1 * | 8/2007 | Tatar et al. | 370/392 |
| 2008/0262928 | A1 * | 10/2008 | Michaelis | 705/14 |
| 2009/0161676 | A1 * | 6/2009 | Breau et al. | 370/392 |

* cited by examiner

Primary Examiner — Phong Nguyen
(74) Attorney, Agent, or Firm — Farjami & Farjami LLP

(57) ABSTRACT

There is provided a system and method for optimized filtered data feeds to capture data and send to multiple destinations. There is provided a system comprising a memory and a processor. The memory has a database associating data feed patterns to one or more of a plurality of destinations. The processor captures data from a data feed having a data feed destination, stores the data in the memory, compares the data feed with the data feed patterns in the database to determine matched patterns, retrieves one or more destinations associated with the matched patterns, and sends the data to the data feed destination and the retrieved destinations. There is also provided a system comprising data feed sources, destinations, a network connected to the data feed sources and the destinations, and a server configured to intercept and route network traffic on the network, the server including a memory and a processor.

21 Claims, 4 Drawing Sheets

SYSTEM AND METHOD FOR OPTIMIZED FILTERED DATA FEEDS TO CAPTURE DATA AND SEND TO MULTIPLE DESTINATIONS

BACKGROUND OF THE INVENTION

1. Field of the Invention

The present invention relates generally to computer systems. More particularly, the present invention relates to systems for processing of computer data.

2. Background Art

When transferring data over networks, data generally travels point to point, from a single source to a single destination, unless specially configured otherwise. However, there are often situations where multiple interested data consumers need to receive the same data for other purposes. For example, if the server of a game company is collecting data about users from online game servers, multiple internal departments at the game company may need access to such data. Website administrators may need that data to update high scores and leader boards. The marketing department may need that data to pinpoint areas of growth. The programming and engineering department may need that data for debugging purposes.

If multiple data destinations are required, some amount of manual configuration is often necessary for proper data routing. Typically this entails a custom coded application at the source and destination ends, specialized proxies that are configured to correctly route the data feeds to the intended multiple destinations, or a periodic scan for data in a centralized data store such as a database. However, there are a number of problems with each approach. The custom coded application approach requires reprogramming and redeployment when a change in routing requirements occurs, requiring staff resources and possibly leading to downtime, which may be unacceptable for certain situations. Similarly, specialized proxies must be correctly configured and reconfigured when data routing requirements change. A periodic scan approach is problematic in that it is periodic, leading to outdated data. For example, situations where data must be received in near real-time, such as streaming live video content, for example, will not be amenable to a periodic scan approach.

Accordingly, there is a need to overcome the drawbacks and deficiencies in the art by providing a system to flexibly route data to multiple destinations, without requiring disruptive downtime or burdensome maintenance.

SUMMARY OF THE INVENTION

A system and method for optimizing and filtering data feeds to capture data and send to multiple destinations, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for optimized filtered data feeds to capture data and send to multiple destinations. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
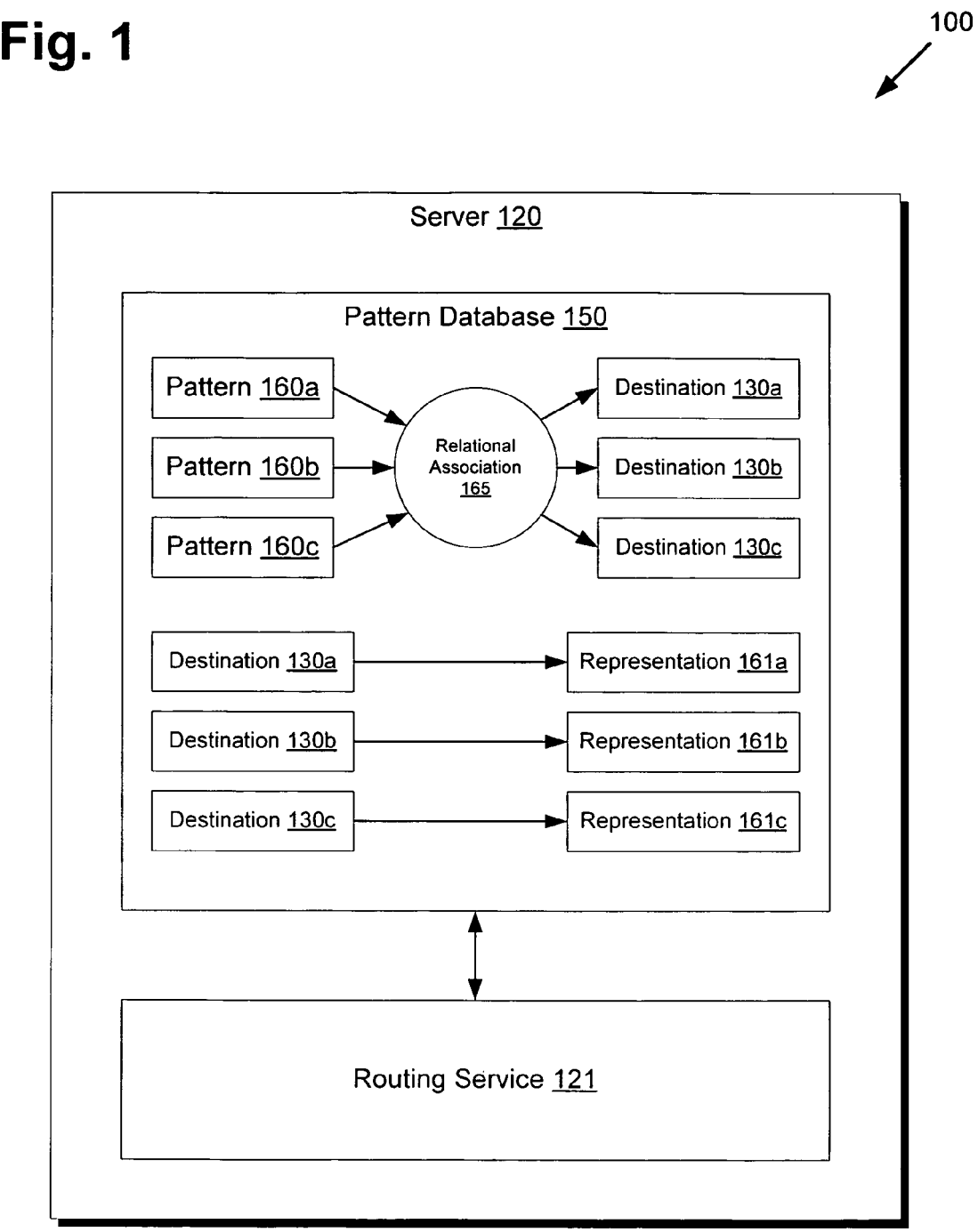
FIG. 1 presents a device for optimizing and filtering data feeds to capture data and send to multiple destinations, according to one embodiment of the present invention.

FIG. 1 presents a device for optimizing and filtering data feeds to capture data and send to multiple destinations, according to one embodiment of the present invention. Server environment 100 of FIG. 1 includes server 120, which includes pattern database 150 and routing service 121. Pattern database 150 includes a one-to-many relational association 165, which relates patterns 160a, 160b, and 160c to one or more destinations 130a, 130b, and 130c. Pattern database 150 also includes a one-to-one relational association, relating destinations 130a, 130b, and 130c to representations 161a, 161b, and 161c, respectively. Pattern database 150 is accessible to routing service 121 executing on server 120. Pattern database 150 is stored on a memory of server 120, and routing service 121 executes on a processor of server 120.

Pattern database 150 is used to filter incoming and outgoing data feeds against a particular desired trait encapsulated by patterns 160a, 160b, and 160c in FIG. 1. These patterns can flexibly represent any criteria for matching and categorizing data. For example, patterns 160a, 160b, and 160c could represent that the originating host of an incoming data feed matches a particular domain. Alternatively, the patterns could represent that the destination matches a particular domain. Other metadata included in the data feeds might be matched against, such as an included identifier. This identifier might be a Uniform Resource Identifier (URI), a Uniform Resource Locator (URL), or an Extensible Markup Language (XML) Path Language (XPath) expression. Besides matching the entire identifier, only a portion of the identifier might be matched against as well. Additionally, the data itself within the data feed might be matched against a particular string of text, some binary data, a regular expression, or some other defined schema. Although the previous examples match patterns 160a, 160b, and 160c to the same pattern type, pattern database 150 could also mix patterns of different types as well. For example, pattern 160a could match on the originating host, pattern 160b could match on the destination, and pattern 160c could match on a portion of a URL.

Using an online game company running on a local domain "intranet.net" as an example, pattern 160a might represent the condition "URL=http://userdb.intranet.net/userstatistics/XMLstatistics-schema/user-data.jsp", pattern 160b might represent "URL=http://gamedb.intranet.net/onlineRPG/XMLRPGscoring-schema/ranking-data.jsp", and pattern 160c might then represent "URL=http://gamedb.intranet.net/onlineFPS/XMLFPSscoring-schema/ranking-data.jsp." The URL might be embedded within a Hypertext Transfer Protocol (HTTP) POST request, which sends data to the indicated URL. Thus, in this embodiment, the destination represented by a URL in a HTTP POST request is used as the filtering criteria for patterns 160a-160c. More specifically, pattern 160a represents the situation where user statistic data is sent to the "userdb" host, pattern 160b represents the situation where player ranking data is sent to the "gamedb" host regarding an online role playing game (RPG), and pattern 160c represents the situation where player ranking data is also sent to the "gamedb" host but in regards to an online first person shooter (FPS) game.

Routing service 121, which is executing on a processor of server 120, accesses this list of patterns contained in pattern database 150, and might hash and cache it within local memory to optimize the speed of pattern recognition for incoming and outgoing data feeds. Once routing service 121 confirms a data feed matches a particular pattern within pattern database 150, the proper destinations can be retrieved through relational association 165. Continuing with the online game company example, destination 130a might target a URL for an internal web development team in charge of updating a list of publicly accessible leader boards, destination 130b might target a URL for an internal research and development (R&D) department, and destination 130c might target a URL for an internal marketing department. Since pattern 160a, user statistic data, might be of interest to both the R&D and marketing departments, relational association 165 might specify that pattern 160a should be forwarded to destinations 130b and 130c. Patterns 160b and 160c, regarding player ranking data, may be of interest to the leader board web team and the R&D department in gauging player progress and detecting irregularities such as hacked accounts returning improbable player rankings. Thus, relational association 165 might specify that patterns 160b and 160c should be forwarded to destinations 130a and 130b.

Continuing with the online game company example, if an incoming data feed indicates "http://userdb.intranet.net/userstatistics/XMLstatistics-schema/user-data.jsp" as the destination URL, routing service 121 would detect that the URL of the data feed matches pattern 160a. Thus, besides being sent to the original URL as specified, routing service 121 will also send to destinations 130b and 130c. A data feed indicating "http://gamedb.intranet.net/onlineRPG/XMLRPGscoring-schema/ranking-data.jsp" as the destination URL will match pattern 160b, leading routing service 121 to additionally send to destinations 130a and 130b. "http://gamedb.intranet.net/onlineFPS/XMLFPSscoring-schema/ranking-data.jsp," will match pattern 160c, leading routing service 121 to additionally send to destinations 130a and 130b. In this manner, multiple or a plurality of destinations can automatically receive data feeds of interest, merely by integrating server 120 within an appropriately configured network. Additionally, the routing can be flexibly altered even during operation through some simple modifications to relational association 165 in pattern database 150.

Besides simply sending the data as is, routing service 121 of server 120 might additionally apply various data transformations to convert data from one representation to another. Thus, pattern database 150 may have information regarding these desired representation transformations, which are shown by the one-to-one relations linking destinations 130a, 130b, and 130c to representations 161a, 161b, and 161c, respectively. For these representational transformations to work, routing service 121 will also require information regarding an original defined representation that particular data adheres to. In the online game company example above, these representations may be indicated as part of the destination URL. For example, pattern 160a indicating the URL "http://userdb.intranet.net/userstatistics/XMLstatistics-schema/user-data.jsp" may imply that the associated data will be in the "XMLstatistics-schema" representation, or an XML file using a particular schema tailored for statistical data. Alternatively, the particular defined representation might be explicitly included as metadata within the data feed. Once routing server 121 determines the defined representation of a particular set of data and a particular destination that it should be sent to, it may lookup a desired representational transformation for that particular destination within pattern database 150, converting the data to a representation that may be more optimally parsed by the destination.

For example, representation 161a might specify JavaScript Object Notation (JSON), so that the incoming player ranking data can be more easily integrated with web servers that manipulate data using JSON at destination 130a. Representation 161b might specify a Structured Query Language (SQL) statement, so that the database servers in the R&D department at destination 130b can easily insert the incoming data into a database. Representation 161c might specify a more simple representation, such as comma separated values (CSV) or schema formatted binary data, facilitating on-screen display of tabular data or appending of data to a rolling log file. Thus, if these representational conversion rules were stored in pattern database 150, then prior to sending data to an intended destination, routing service 121 would convert data for destination 130a from an XML representation "XMLstatistics-schema" to JSON, convert data for destination 130b from an XML representation "XMLRPGscoring-schema" to a SQL statement, and convert data for destination 130c from an XML representation "XMLFPSscoring-schema" to CSV or schema formatted binary data. In this manner, the converted data arrives at the destination in an optimal representation that is more appropriate for the particular tasks to be done at the destination end. Neither the source nor the destination needs to be manually configured to implement these conversions, as server 120 handles the conversions transparently with the information from pattern database 150.

Figure 2:
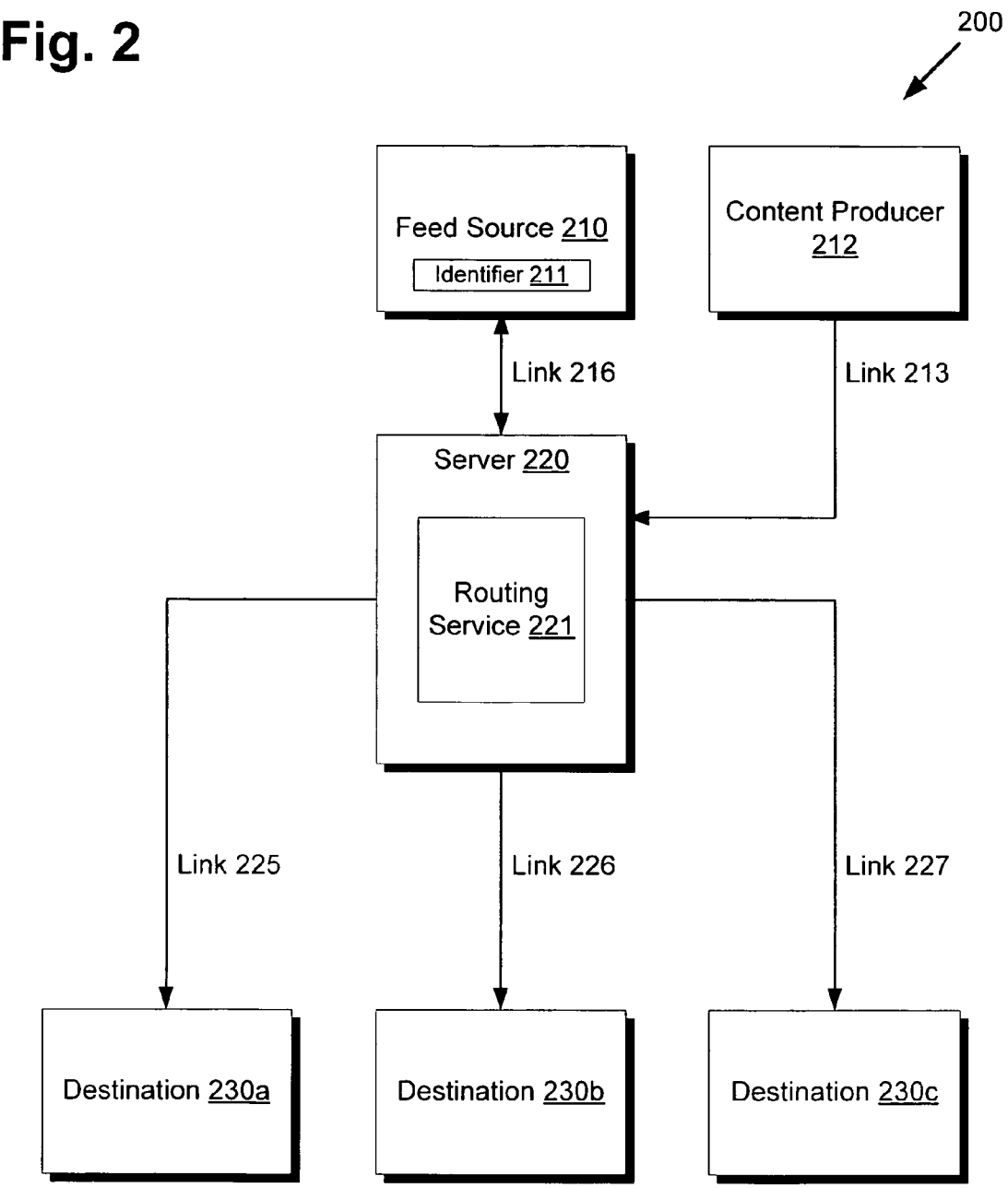
FIG. 2 presents a system for optimizing and filtering data feeds to capture data and send to multiple destinations, according to one embodiment of the present invention.

FIG. 2 presents a system for optimizing and filtering data feeds to capture data and send to multiple destinations, according to one embodiment of the present invention. Network environment 200 of FIG. 2 includes feed source 210, content producer 212, server 220, and destinations 230a, 230b, and 230c. Feed source 210 includes identifier 211. Server 220 corresponds to server 120 from FIG. 1. Server 220 also includes routing service 221, corresponding to routing service 121 from FIG. 1. Link 216 provides a data path between feed source 210 and server 220. Link 213 provides a data path between content producer 212 and server 220. Links 225, 226, and 227 provide a data path between server 220 and destinations 230a, 230b, and 230c, respectively. A local area intranet or a wide area network such as the Internet might provide the network connectivity for the above links.

Feed source 210 in FIG. 2 might represent, for example, a Really Simple Syndication (RSS) feed providing technology news to the public. When new articles arrive at feed source 210, various internal departments at the associated content provider site might be interested in receiving the feed data. For example, destination 230a might represent a real-time monitoring system that displays news articles as they are submitted. Destination 230b might represent a data warehouse that archives all news stories, indexing them for easy search engine retrieval. Destination 230c might represent the accounting department, which keeps track of article word counts and authorship to calculate contributing writer salaries.

Continuing with the technology news site example, writers Bill and Steve from content producer 212 might submit a new article approved for publication covering the release of the new Orange Computer Mikan Deluxe Notebook. Content producer 212 then sends out the newly approved article to feed source 210, to be disseminated to the wider public by website and RSS feed. Server 220 may be placed as an intermediary in the network, with routing service 221 receiving the article data from link 213 and forwarding the data to its original data feed destination via link 216. Routing service 221 might also forward the article data to additional destinations 230a, 230b, and 230c. Thus, the data feed is sent to multiple destinations, including feed source 210 and destinations 230a, 230b, 230c. Using a procedure similar to that described with FIG. 1, routing service 221 may access a pattern database that directs it to detect outgoing article data destined for feed source 210 identified by identifier 211, which might comprise the URL of a staff only article submission webpage. The pattern database is not specifically shown in FIG. 2 for the sake of clarity. Once such matching data is found, routing service 221 might consult a relational database directing that the data should be sent to multiple destinations 230a, 230b, and 230c via links 225, 226, and 227, respectively. Thus, the usual RSS subscribers to the feed receive the Mikan news update as scheduled, the real-time monitoring station displays the new story, the data warehouse indexes and archives the story, and the accounting department duly credits Bill and Steve for their work.

Figure 3:
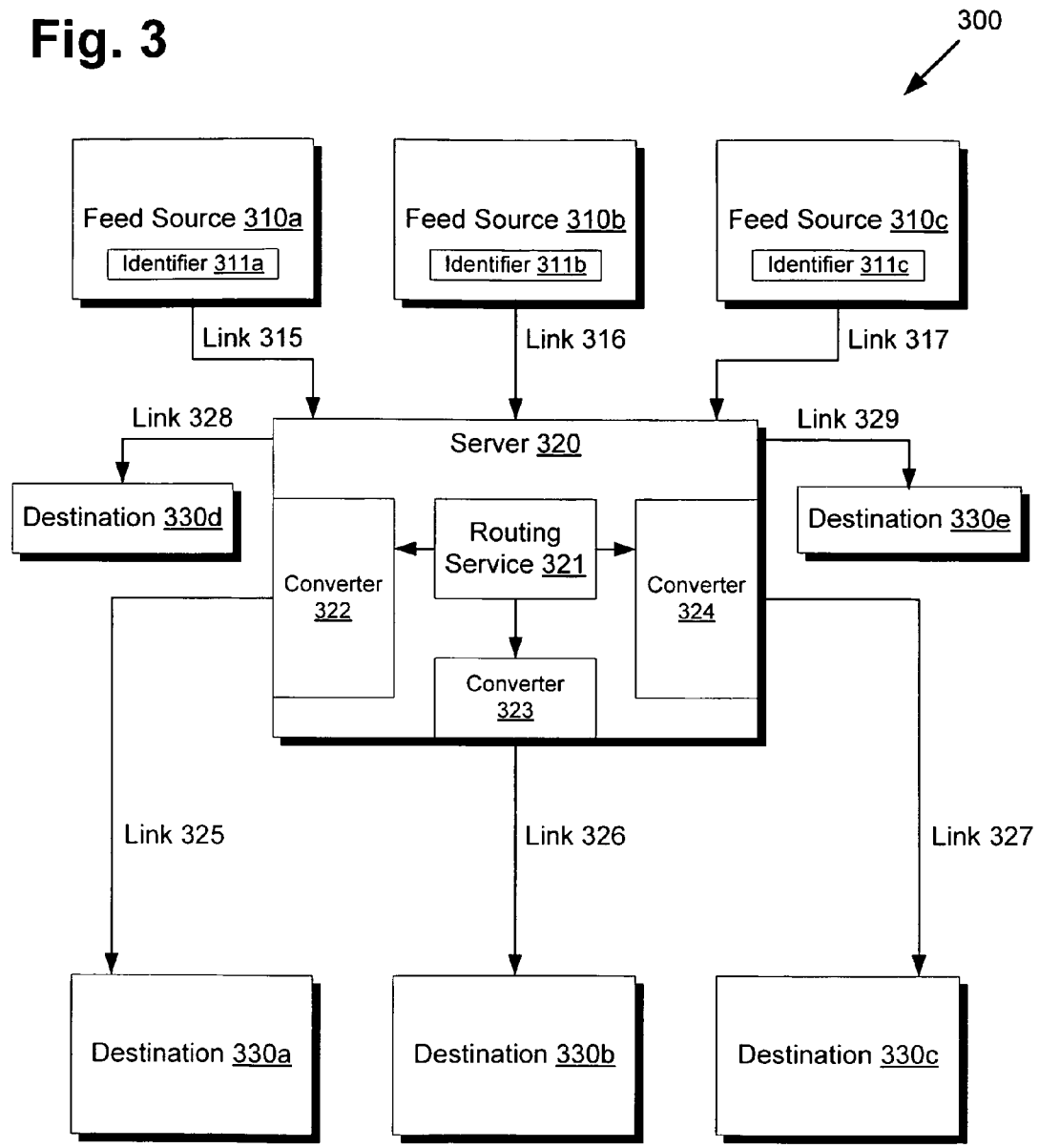
FIG. 3 presents a system for optimizing and filtering data feeds to capture data and send to multiple destinations, according to another embodiment of the present invention.

FIG. 3 presents a system for optimizing and filtering data feeds to capture data and send to multiple destinations, according to another embodiment of the present invention. Network environment 300 of FIG. 3 includes feed sources 310a, 310b, and 310c, server 320, and destinations 330a, 330b, 330c, 330d, and 330e. Feed sources 310a, 310b, and 310c correspond to feed source 210 from FIG. 2. Feed sources 310a, 310b, and 310c also include identifiers 311a, 311b, and 311c, respectively, corresponding to identifier 211 from FIG. 2. Server 320 corresponds to server 220 from FIG. 2. Server 320 also includes routing service 321, converter 322, converter 323, and converter 324. Links 315, 316, and 317 provide data paths between server 320 and feed sources 310a, 310b, and 310c, respectively. Converters 322, 323, and 324 apply data representation conversion to the data paths provided by links 325, 326, and 327, respectively. Links 325, 326, 327, 328, and 329 provide data paths from server 320 to destinations 330a, 330b, 330c, 330d, and 330e, respectively. A local area intranet or a wide area network such as the Internet might provide the network connectivity for the above links.

Returning to the online game company example used with FIG. 1, feed source 310a might comprise a server responsible for the operation of an online RPG game, "Lucifer 3 Online," feed source 310b might comprise a server responsible for the operation of an online FPS game, "Warfield 2099," and feed source 310c might comprise a server responsible for the operation of an online zombie simulator, "Second Undead." Destinations 330a, 330b, and 330c might correspond to the leader board web team, the R&D department, and the marketing department, respectively. Destination 330d might represent the "userdb" host, while destination 330e represents the "gamedb" host.

If routing service 321 consults a pattern database with a similar matching rule set as the example used with FIG. 1, then routing service 321 of server 320 might additionally send data destined for destination 330d (userdb) to destinations 330b (R&D) and 330c (marketing), whereas data destined for destination 330e (gamedb) might be additionally sent to destinations 330a (web) and 330b (R&D). As with FIG. 2, the pattern database is omitted from FIG. 3 to aid in clarity. The pattern database may also have matching patterns based on the source of the data feed, using identifiers 311a, 311b, and 311c to associate data stream sources with feed sources 310a, 310b, and 310c, respectively. For example, the online zombie simulator Second Undead might be in a restricted beta trial phase, so it might be desirable to ignore data collected from feed source 310c until Second Undead goes live to the public. In this beta trial case, there might be a negative rule in the pattern database, directing that data sourced from identifier 311c should not be sent to multiple destinations, even if the data might match some other matching pattern that would normally direct routing service 321 to send to multiple destinations.

Additionally, routing service 321 might convert the representations of the data into more optimal representations for the receiving destinations. By accessing rules from the pattern database, routing service 321 might determine that converter 322 should convert incoming XML data into HyperText Markup Language (HTML) for easy integration into a web server, that converter 323 should convert incoming XML data into SQL statements for easy insertion into a database, and that converter 324 should convert incoming XML version 1.1 data into XML version 1.0 data, since the workstations installed at the marketing department do not yet support XML version 1.1. Thus, prior to sending data through links 325, 326, and 327, converters 322, 323, and 324, respectively, can convert the defined representations of incoming data into the desired representations for each destination.

Figure 4:
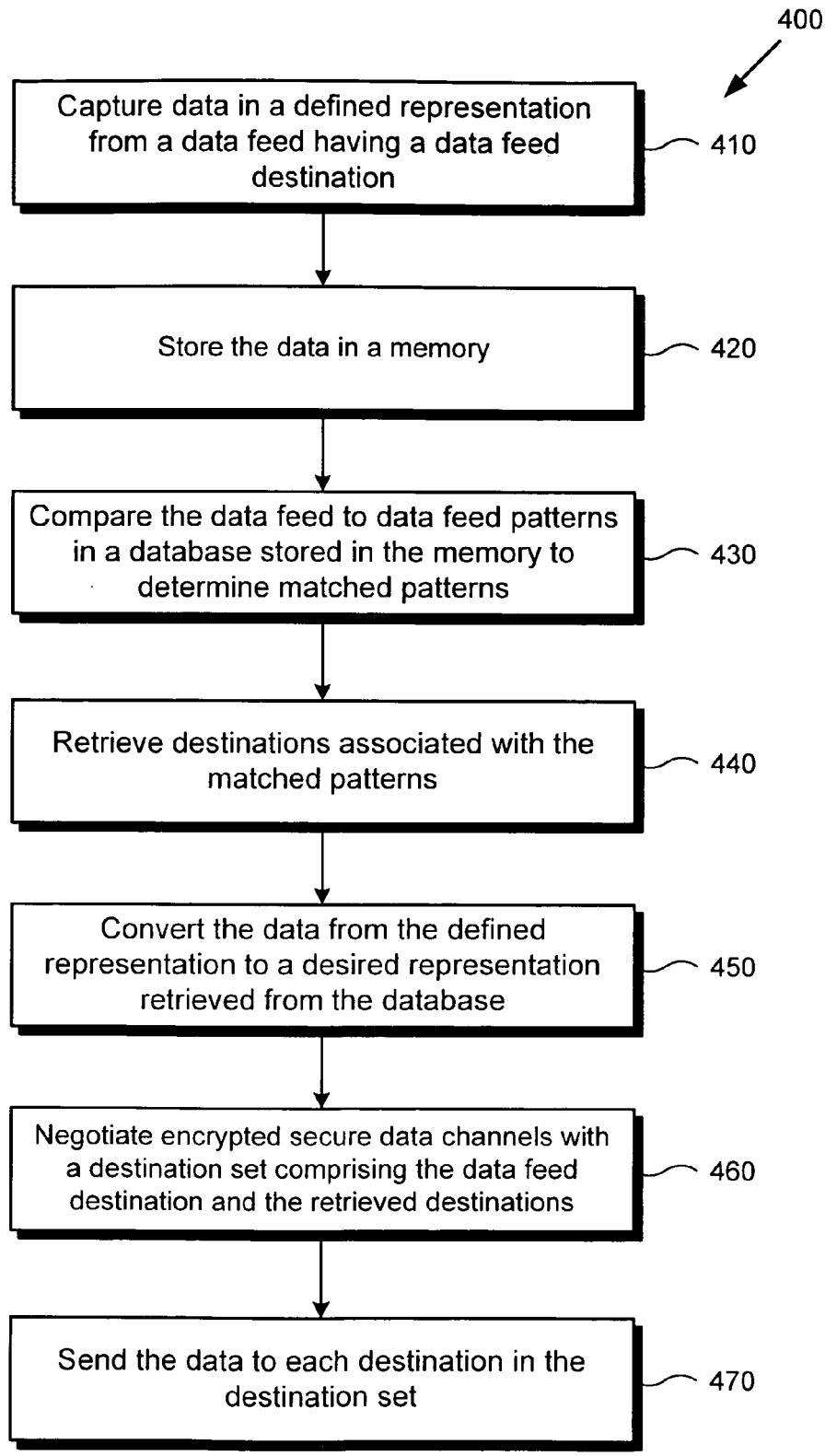
FIG. 4 shows a flowchart describing the steps, according to one embodiment of the present invention, by which a device can optimize and filter data feeds to capture data and send to multiple destinations.

FIG. 4 shows a flowchart describing the steps, according to one embodiment of the present invention, by which a device can optimize and filter data feeds to capture data and send to multiple destinations. Certain details and features have been left out of flowchart 400 that are apparent to a person of ordinary skill in the art. For example, a step may comprise one or more substeps or may involve specialized equipment or materials, as known in the art. While steps 410 through 470 indicated in flowchart 400 are sufficient to describe one embodiment of the present invention, other embodiments of the invention may utilize steps different from those shown in flow chart 400.

Referring to step 410 of flowchart 400 in FIG. 4 and network environment 200 of FIG. 2, step 410 of flowchart 400 comprises the processor of server 220 running routing service 221 to capture data in a XML representation from a data feed provided by content producer 212, having a data feed destination, feed source 210. Routing service 221 might detect on an incoming or outgoing data feed, depending on the particular configuration requirements. For illustrative purposes, the technology news site example used in conjunction with FIG. 2 above will also be used in the explanation of flowchart 400.

Referring to step 420 of flowchart 400 in FIG. 4 and network environment 200 of FIG. 2, step 420 of flowchart 400 comprises the processor of server 220 storing the data captured from step 410 into a memory. This memory might be a dynamic random access (DRAM) chip, a hard disk drive (HDD), or some other storage medium accessible to the processor for future retrieval. Alternatively, if a particular data feed is marked cacheable and is found to already exist in the memory of server 220, the cached copy might be used instead for improved performance, negating the need for step 420.

Referring to step 430 of flowchart 400 in FIG. 4 and network environment 200 of FIG. 2, step 430 of flowchart 400 comprises the processor of server 220 comparing the data feed stored from step 420 to data patterns in a pattern database stored in the memory to determine a matched pattern, the matched pattern specifying that the data feed destination of the data feed is set to the destination identified by identifier 211. Although this particular example only matches to a single pattern, a data feed could match to multiple patterns, particularly if the data patterns cover several characteristics of the data feed. Since this might result in a large number of data patterns to match, there might be a hashing procedure or some other efficient search algorithm applied to this matching step to the optimize detection speed for large amounts of transactions. For example, an identifier contained within the data feed might be hashed into a digest value and compared against a hash table populated with hashed identifier indexes for fast retrieval, the identifier indexes corresponding to the identifiers for detection. If additional properties such as source origin or binary data are also to be pattern matched, hash values and hash tables might be prepared for those properties as well.

Referring to step 440 of flowchart 400 in FIG. 4 and network environment 200 of FIG. 2, step 440 of flowchart 400 comprises the processor of server 220 retrieving destinations 230a, 230b, and 230c by using the matched patterns retrieved from step 430 to query the pattern database for destinations. Since in the example used with FIG. 2, all three destinations are interested in receiving data feeds regarding newly approved technical news articles, the pattern database will indicate this condition after step 440 finishes.

Referring to step 450 of flowchart 400 in FIG. 4 and network environment 200 of FIG. 2, step 450 of flowchart 400 comprises the processor of server 220 converting the data feed from a defined representation to a desired representation retrieved from the pattern database. Although no representation conversion is depicted in FIG. 2, converters in an arrangement similar to converters 322, 323, and 324 in FIG. 3 might be added to provide representation conversion functionality, as described with FIG. 3 above. Alternatively, step 450 may be omitted if no transformation of data representation is necessary, in which case server 220 passes the data as is without modification, which may preserve the computing resources of server 220 for other tasks. This might be feasible if a standardized representation, such as a particular version of XML, is adopted as a precondition for all data feed transactions.

Referring to step 460 of flowchart 400 in FIG. 4 and network environment 200 of FIG. 2, step 460 of flowchart 400 comprises the processor of server 220 negotiating encrypted secure channels over links 225, 226, 227, and 216. If, for example, link 213 is connected over a secure private intranet, but links 225, 226, 227, and 216 have to be directed over the insecure Internet, it may be desirable to apply data encryption and security at a centralized point such as server 220. Thus, server 220 might negotiate secure links using protocols such as Transport Layer Security (TLS), Secure Sockets Layer (SSL), and Secure Shell (SSH). Since being the first to break a news article is often of paramount importance in news reporting, it may be desirable to prevent malicious competitors or curious gossips from surreptitious eavesdropping of exclusive news, such as the story by Bill and Steve regarding the brand new Mikan notebook computer. Such sensitive data feeds may render step 460 as worthwhile insurance versus the increased complexity and cost of the security enabled system and network. Less sensitive data feeds might skip step 460 to save processing resources for other tasks.

Referring to step 470 of flowchart 400 in FIG. 4 and network environment 200 of FIG. 2, step 470 of flowchart 400 comprises the processor of server 220 sending the encrypted data from step 460 over newly secured links 225, 226, 227, and 216. If step 460 was skipped, then step 470 sends the unencrypted data from the previous step over standard insecure links 225, 226, 227, and 216. In either situation, data is sent to multiple destinations, or a destination set comprising the data feed destination, feed source 210, and the additional destinations from the matched patterns in the database, destinations 230a, 230b, and 230c. Although FIG. 2 depicts links 225, 226, and 227 directly connected with the desired destinations, a more complex network might include multiple routing servers, each handling different aspects of data feeds or distributing the filtering workload to multiple servers to prevent performance and network bottlenecks. Thus, the steps shown in flowchart 400 might be repeated numerous times before a data feed finally reaches its intended destinations.

As part of the advantages of various embodiments of the present invention, interested data consumers can retrieve fresh data in real-time or near real-time, rather than relying on periodic polling or some other non real-time mechanism, which leads to stale and quickly outdated data. Changes to the system are easily introduced, even during operation, through simple modifications to the utilized database, thanks to the generalized nature of the routing device. Data can also be flexibly converted from one representation to another, better accommodating specific data implementations at particular locations. Adding encryption and security capabilities can optionally provide a centralized location for protecting sensitive data feeds. By adhering to existing standards and protocols, the device can easily integrate into existing networks and infrastructures, minimizing the amount of time required for custom programming and administration versus proprietary and manually configured solutions.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for monitoring data feeds and directing data in the data feeds to a plurality of destinations, the system comprising:
   a memory having a database including data feed patterns, wherein each of the data feed patterns in the database is associated with one or more of the plurality of destinations;
   a processor configured to:
      capture data from a data feed having a data feed destination specified by a source;
      store the data in the memory;

compare the data feed with the data feed patterns in the database to determine one or more matched patterns between the data feed and the data feed patterns;

retrieve one or more destinations associated with the one or more matched patterns;

send the data to the data feed destination specified by the source; and send the data also to the one or more destinations associated with the one or more matched patterns other than patterns indicative of any destination specified in the data feed by the source;

wherein the database further includes destinations, each destination associated with a desired representation, and wherein the processor is further configured to query the database and convert the data from a defined representation to an associated desired representation prior to sending the data to each associated destination in a destination set comprising the data feed destination and the one or more destinations associated with the one or more matched patterns.

2. The system of claim 1, wherein the desired representation is one of Extensible Markup Language (XML), JavaScript Object Notation (JSON), comma separated values (CSV), Structured Query Language (SQL), or binary data in a defined schema.

3. The system of claim 1, wherein the desired representation is a different version or revision of the defined representation.

4. The system of claim 1, wherein the data feed patterns in the database include a data teed destination of a data feed.

5. The system of claim 1, wherein the identifier is a portion of a Uniform Resource Identifier (URI), a portion of a Uniform Resource Locator (URL), or an XML Path Language (XPath) expression.

6. The system of claim 1, wherein the data pattern within the data of the data feed comprises a string of text, a binary data, and a regular expression.

7. The system of claim 1, wherein the data feed patterns comprise an identifier and a data pattern within the data of the data feed.

8. The system of claim 1, wherein:
at least one of the data feed patterns in the database is associated with two or more of the plurality of destinations; and
the processor is configured to:
retrieve two or more destinations associated with the at least one of the data feed patterns;
send the data to the data feed destination specified by the source; and
send the data also to the two or more destinations associated with the at least one of the data feed patterns.

9. A system for monitoring data feeds and directing data in the data feeds to a plurality of destinations, the system comprising:
a memory having a database including data feed patterns, wherein each of the data feed patterns in the database is associated with one or more of the plurality of destinations;
a processor configured to:
capture data from a data feed having a data feed destination specified by a source;
store the data in the memory;
compare the data feed with the data feed patterns in the database to determine one or more matched patterns between the data feed and the data feed patterns;
retrieve one or more destinations associated with the one or more matched patterns;
send the data to the data feed destination specified by the source; and
send the data also to the one or more destinations associated with the one or more matched patterns other than patterns indicative of any destination specified in the data feed by the source;
wherein the processor is further configured to negotiate an encrypted secure data channel prior to sending the data to each destination in a destination set comprising the data feed destination and the one or more destinations associated with the one or more matched patterns.

10. A system for monitoring data feeds and directing data in the data feeds to destinations, the system comprising:
a plurality of data feed sources;
a plurality of destinations;
a network connected to the plurality of data feed sources and the plurality of destinations;
a server configured to intercept and route network traffic on the network, the server comprising:
a memory having a database including data feed patterns, wherein each of the data feed patterns in the database is associated with one or more of the plurality of destinations;
a processor configured to:
capture data from a data feed having a data feed destination specified by a source;
store the data in the memory;
compare the data feed with the data feed patterns in the database to determine one or more matched patterns between the data feed and the data feed patterns;
retrieve one or more destinations associated with the one or more matched patterns;
send the data to the data feed destination specified by the source; and
send the data also to the one or more destinations associated with the one or more matched patterns other than patterns indicative of any destination specified in the data feed by the source;
wherein the database further includes destinations, each destination associated with a desired representation, and wherein the processor is further configured to query the database and convert the data from a defined representation to an associated desired representation prior to sending the data to each associated destination in a destination set comprising the data feed destination and the one or more destinations associated with the one or more matched patterns.

11. The system of claim 10, wherein the data feed patterns comprise an identifier and a data pattern within the data of the data feed.

12. The system of claim 10, wherein:
at least one of the data feed patterns in the database is associated with two or more of the plurality of destinations; and
the processor is configured to:
retrieve two or more destinations associated with the at least one of the data feed patterns;
send the data to the data feed destination specified by the source; and
send the data also to the two or more destinations associated with the at least one of the data feed patterns.

13. A method monitoring data feeds and directing data in the data feeds to a plurality of destinations, the method comprising:
capturing data from a data feed having a data feed destination specified by a source;

storing the data in a memory, the memory having a database including data feed patterns, wherein each of the data feed patterns in the database is associated with one or more of the plurality of destinations;

comparing the data feed with the data feed patterns in the database to determine one or more matched patterns between the data feed and the data feed patterns;

retrieving one or more destinations associated with the one or more matched patterns;

sending the data to the data feed destination specified by the source; and sending the data also to the one or more destinations associated with the one or matched patterns other than patterns indicative of any destination specified in the data feed by the source;

wherein the database further includes destinations, each destination associated with a desired representation, and wherein the method further comprises querying the database and converting the data from a defined representation to an associated desired representation prior to sending the data to each associated destination in a destination set comprising the data feed destination and the one or more destinations associated with the one or more matched patterns.

14. The method of claim 13, wherein the desired representation is one of Extensible Markup Language (XML), JavaScript Object Notation (JSON), comma separated values (CSV), Structured Query Language (SQL), or binary data in a defined schema.

15. The method of claim 13, wherein the desired representation is a different version or revision of the defined representation.

16. The method of claim 13, wherein the data feed patterns in the database include a data feed destination of a data feed.

17. The method of claim 13, wherein the identifier is a portion of a Uniform Resource Identifier (URI), a portion of a Uniform Resource Locator (URL), or an XML Path Language (XPath) expression.

18. The method of claim 13, wherein the data pattern within the data of the data feed comprises a string of text, a binary data, and a regular expression.

19. The method of claim 13, wherein the data feed patterns comprise an identifier and a data pattern within the data of the data feed.

20. The method of claim 13, wherein at least one of the data feed patterns in the database is associated with two or more of the plurality of destinations, and the method further comprising:

retrieving two or more destinations associated with the at least one of the data feed patterns;

sending the data to the data feed destination specified by the source; and sending the data also to the two or more destinations associated with the at least one of the data feed patterns.

21. A method monitoring data feeds and directing data in the data feeds to a plurality of destinations, the method comprising:

capturing data from a data feed having a data feed destination specified by a source;

storing the data in a memory, the memory having a database including data feed patterns, wherein each of the data feed patterns in the database is associated with one or more of the plurality of destinations;

comparing the data feed with the data feed patterns in the database to determine one or more matched patterns between the data feed and the data feed patterns;

retrieving one or more destinations associated with the one or more matched patterns;

sending the data to the data feed destination specified by the source; and sending the data also to the one or more destinations associated with the one or more matched patterns other than patterns indicative of any destination specified in the data feed by the source;

wherein the method further comprises negotiating an encrypted secure data channel prior to sending the data to each destination in a destination set comprising the data feed destination and the one or more destinations associated with the one or more matched patterns.

* * * * *

UNITED STATES PATENT AND TRADEMARK OFFICE
CERTIFICATE OF CORRECTION

PATENT NO. : 8,335,793 B2
APPLICATION NO. : 12/229482
DATED : December 18, 2012
INVENTOR(S) : Young, Jr. et al.

Page 1 of 1

It is certified that error appears in the above-identified patent and that said Letters Patent is hereby corrected as shown below:

In the Claims

Column 9, line 30, "teed" should be changed to --feed--.

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO. : 8,335,793 B2  
APPLICATION NO. : 12/229482  
DATED : December 18, 2012  
INVENTOR(S) : Young et al.

Page 1 of 1

It is certified that error appears in the above-identified patent and that said Letters Patent is hereby corrected as shown below:

In The Claims

Column 9, line 31, "claim 1" should be changed to --claim 7--.

Column 11, line 34, "claim 13" should be changed to --claim 19--.

Signed and Sealed this
Seventeenth Day of February, 2015

Michelle K. Lee
*Deputy Director of the United States Patent and Trademark Office*